United States Patent
Storm et al.

(10) Patent No.: US 7,804,537 B2
(45) Date of Patent: Sep. 28, 2010

(54) COMBINED LINEAR-LOGARITHMIC IMAGE SENSOR

(75) Inventors: Graeme Storm, Edinburgh (GB); Jonathan Ephriam David Hurwitz, Edinburgh (GB)

(73) Assignee: STMicroelectronics Ltd., Marlow - Buckinghamshire (GB)

( * ) Notice: Subject to any disclaimer, the term of this patent is extended or adjusted under 35 U.S.C. 154(b) by 982 days.

(21) Appl. No.: 10/820,464

(22) Filed: Apr. 8, 2004

(65) Prior Publication Data

US 2004/0227109 A1 Nov. 18, 2004

(51) Int. Cl.
*H04N 5/20* (2006.01)

(52) U.S. Cl. .................... 348/302; 250/208.1

(58) Field of Classification Search ........... 348/241, 348/243, 297, 301–302, 307–308, 310; 250/208.1
See application file for complete search history.

(56) References Cited

U.S. PATENT DOCUMENTS

| | | | | |
|---|---|---|---|---|
| 6,133,563 | A | 10/2000 | Clark et al. | 250/208.1 |
| 6,323,479 | B1 | 11/2001 | Hynecek et al. | 250/214 L |
| 6,355,965 | B1 * | 3/2002 | He et al. | 257/431 |
| 6,593,970 | B1 * | 7/2003 | Serizawa et al. | 348/362 |
| 6,606,121 | B1 * | 8/2003 | Bohm et al. | 348/297 |
| 6,642,500 | B2 * | 11/2003 | Takahashi | 250/214 L |
| 6,697,112 | B2 * | 2/2004 | Morris et al. | 348/302 |
| 6,967,682 | B1 * | 11/2005 | Hagihara | 348/308 |
| 7,071,982 | B2 * | 7/2006 | Luo et al. | 348/308 |
| 2003/0076432 | A1 * | 4/2003 | Luo et al. | 348/308 |
| 2005/0052557 | A1 * | 3/2005 | Kusaka et al. | 348/308 |
| 2006/0044436 | A1 * | 3/2006 | Watanabe | 348/308 |

OTHER PUBLICATIONS

Tu, N. et al.; "CMOS Active Pixel Image Sensor with Combined Linear and Logarithmic Mode Operation"; Department of Electrical Engineering, University of Waterloo, On; 1998 IEEE Canadian Conference on Electrical and Computer Engineering; May 24-28, 1998; vol. 2; p. 754-757.*
Loose, M. et al.; "A self-calibrating single-chip CMOS camera with logarithmic response"; IEEE Journal of Solid-State Circuits, vol. 36, Iss.4; Apr. 2001; pp. 586-596.*
Kavadias, A Logarithmic Response CMOS Image Sensor with On-Chip Calibration, IEEE Journal of Solid-State Circuits, vol. 35, No. 8, Aug. 2000, pp. 1146-1152, XP001075115.

* cited by examiner

*Primary Examiner*—David L Ometz
*Assistant Examiner*—Carramah J Quiett
(74) *Attorney, Agent, or Firm*—Lisa K. Jorgenson; Allen, Dyer, Doppelt, Milbrath & Gilchrist, P.A.

(57) ABSTRACT

An image sensor includes an array of pixels, with each pixel including a photodiode, and a first output circuit for deriving a linear output signal by applying a reset signal to the photodiode and reading a voltage on the photodiode after an integration time. A second output circuit derives a logarithmic output signal by reading a near instantaneous illumination-dependent voltage on the photodiode that is a logarithmic function of the illumination. In the logarithmic mode, the pixels are calibrated to remove fixed pattern noise. The pixels may be operated in linear and log modes sequentially, with the linear output being selected for low light signals and the log output being selected for high light signals.

16 Claims, 3 Drawing Sheets

COMBINED LINEAR-LOGARITHMIC IMAGE SENSOR

FIELD OF THE INVENTION

The present invention relates to electronics, and in particular, to a solid-state image sensor.

BACKGROUND OF THE INVENTION

Dynamic range is a very important parameter of any imaging system. Human vision has the capability to see details across a wide illumination range in a single scene, and is reported to exhibit around 200 dB of dynamic range. Scenes in excess of 100 dB are not uncommon in everyday situations. Consequently, designers of image sensors are continuously looking for ways to increase dynamic range.

In the field of CMOS image sensors, sensors having a log characteristic are used for image scenes having a high dynamic range. In a logarithmic mode the pixel voltage is continuously available to the outside world and no integration time is used. The photocurrent that is induced flows through one or more MOS transistors and sets up a gate-source voltage that is proportional to the logarithm of the photocurrent. This is exemplified in FIG. 1 where the gate-source voltage appears across M2. Since the photocurrent is very small, the MOS device(s) will operate in a sub-threshold, and thus the voltage varies logarithmically with the photocurrent. The voltage is read out by source follower circuitry. Around six decades of light can be captured in the logarithmic mode.

Due to the small devices used in the pixels, a high degree of mismatch results from process variations, which produces fixed pattern noise (FPN) across the array. Logarithmic sensors cannot use double sampling (in its conventional form) for removing mismatch since this technique only removes the variation of device M1 and does not alter the effect of device M2.

Another disadvantage of the logarithmic arrangement is a slow response time for low light levels. Increased photocurrent for a given light level can be accomplished by increasing the size of the light sensing element, but this is not desirable since the cost for a given resolution will increase accordingly.

The prior art discloses designs intended to combine features of linear and logarithmic responses, for example, U.S. Pat. No. 6,323,479 to Hynecek et al., and the article to Tu et al. titled "CMOS Active Pixel Sensor with Combined Linear and Logarithmic Mode Operation", IEEE Canada conference on Electrical and Computer Engineering 1998, vol. 2, pp 754-757, 1998. However, these prior art proposals do not address the FPN and slow response problems.

SUMMARY OF THE INVENTION

In view of the foregoing background, an object of the present invention is to provide an image sensor that overcomes or mitigates the problems of linear and logarithmic sensors.

This and other objects, advantages and features in accordance with the present invention are provided by an image sensor comprising an array of pixels, with each pixel comprising a photodiode. A first output circuit may derive a linear output signal by applying a reset signal to the photodiode and reading a voltage on the photodiode after an integration time. A second output circuit may derive a logarithmic output signal by reading a near instantaneous illumination-dependent voltage on the photodiode that is a logarithmic function of the illumination.

The first output circuit may comprise a reset switch for applying a reset voltage to the photodiode. The reset switch may comprise a reset transistor including a conducting terminal connected to the photodiode. A readout switch may turn on the conducting terminal of the reset transistor after expiration of the integration time. The second output circuit may comprise an amplifier, and a log select switch for connecting the amplifier to the photodiode.

The amplifier may comprise a differential amplifier having an inverting input connected to the conducting terminal of the reset transistor, and a non-inverting input connected to a reference voltage. The image sensor may further comprising a calibration circuit for calibrating each pixel before deriving the logarithmic output signal. The calibrating circuit may comprise a constant current source selectively connected to each respective pixel.

An output node may be associated with each photodiode, and wherein the linear and logarithmic output signals may be derived from the output node. The calibration circuit may further comprise a switch connected between the photodiode and the output node for isolating the photodiode from the output node while calibration takes place.

Another aspect of the present invention is directed to a method for operating an image sensor comprising an array of pixels, with each pixel comprising a photodiode. The method may comprise generating a linear output signal from each pixel, and generating a logarithmic output signal from each pixel. The method may further comprise selecting the linear output signal if the pixel has not saturated during generation of the linear output signal, otherwise, the logarithmic output signal is selected.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

The basis of the invention is to combine a conventional integrating mode with a logarithmic mode. A single frame of image data will have the information for some pixels gathered from the integrating mode and other pixels from the logarithmic mode. The pixels that have saturated during exposure will have a log value (scaled appropriately). This keeps the superior performance of the integrating mode in low light conditions, but adds the high dynamic range of the logarithmic mode.

The combined linear-log system can be used without the need for a framestore. After a period of integration the linear result is read before switching the pixel to the logarithmic mode and reading the log result. The log result is read in a near instantaneous manner, that is, as soon as the log signal has settled and while no other pixel is being addressed. The linear and log results are then combined during the readout phase.

The logarithmic mode can suffer from image lag due to its slow response time, but by using the linear mode for low light levels the present invention in the logarithmic mode only has to process higher photocurrents. Optionally, the addition of an amplifier connected to the pixel will further aid the response time in the logarithmic mode.

Figure 1:
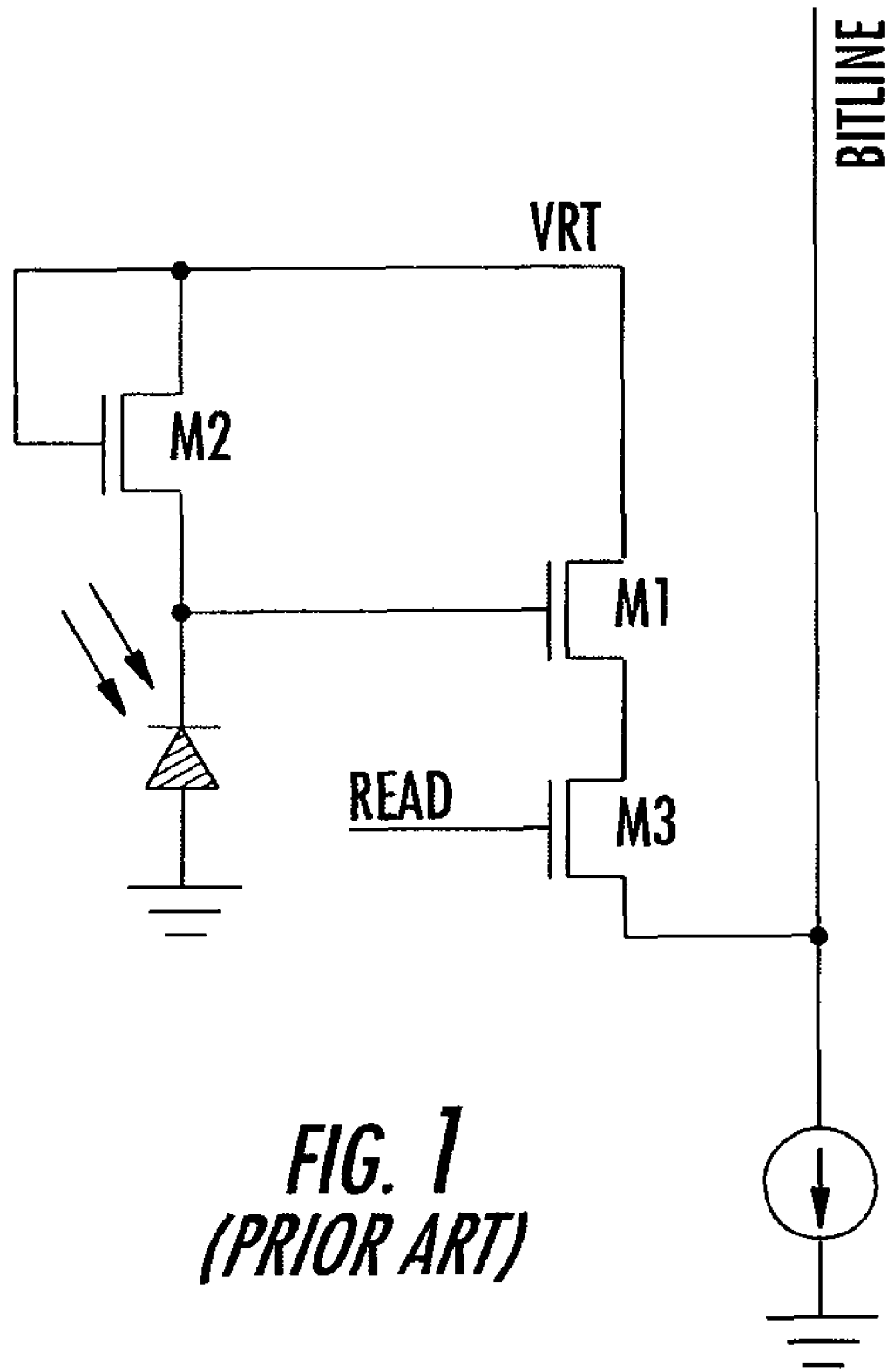
FIG. 1 is a schematic diagram of a pixel in an image sensor according to the prior art.
Figure 2:
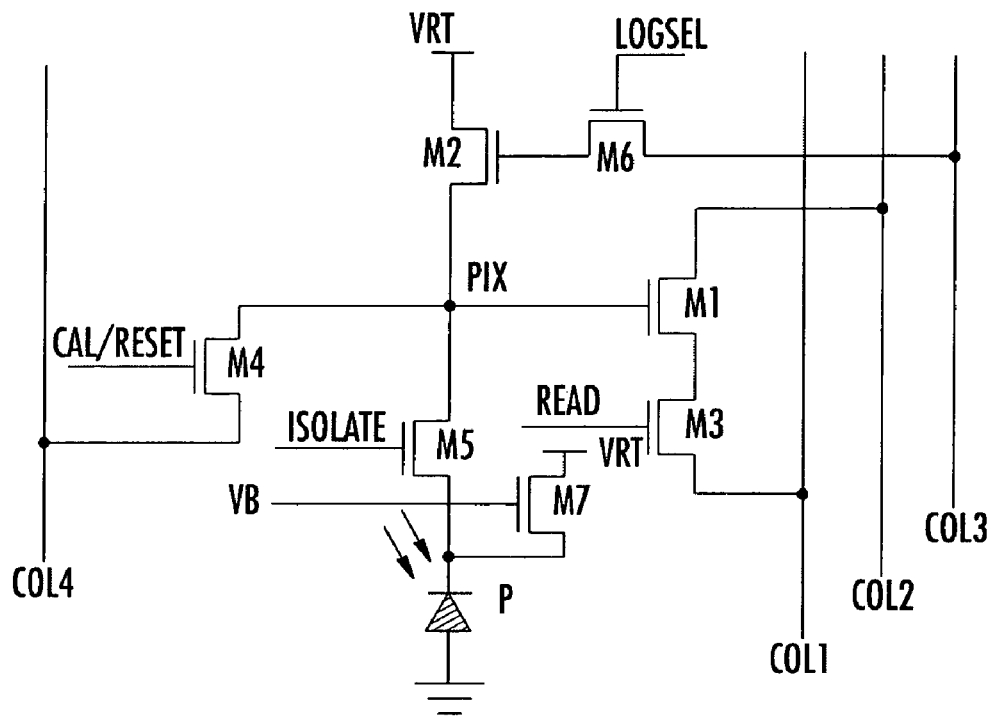
FIG. 2 is a schematic diagram of a pixel in an image sensor forming an example according to the invention.

Referring to FIG. 2, there is shown a single pixel of an image sensor forming one example of the invention. The pixel comprises a photodiode P connected between earth (ground) and a node pix when device M5 is on.

For linear operation the reset voltage Vrt (set in col4) can be sampled onto the node pix by pulsing cal/reset high (applied to transistor M4) and logsel (applied to transistor M6) can be raised to precharge the gate of transistor M2 via col3 low such that it is off and does not affect the integration period. If isolate (applied to transistor M5) is on then the photocurrent generated will lower the voltage on pix. After a set integration time read can be turned on such that M1 now acts as a source follower, with column 2 held at a voltage approximately equal to the reset voltage Vrt and column 1 comprising a current source (not shown).

Optionally, the pixel can include an anti-bloom arrangement to prevent blooming. Blooming is caused by the node pix being driven to near zero volts, allowing leakage of current to adjacent pixels. The anti-bloom arrangement of FIG. 2 comprises a transistor M7 which operates to clamp the photodiode voltage if it falls to some arbitrary low value set by (Vb−Vth$_7$), where Vth$_7$ is the threshold voltage of device M7.

Figure 3:
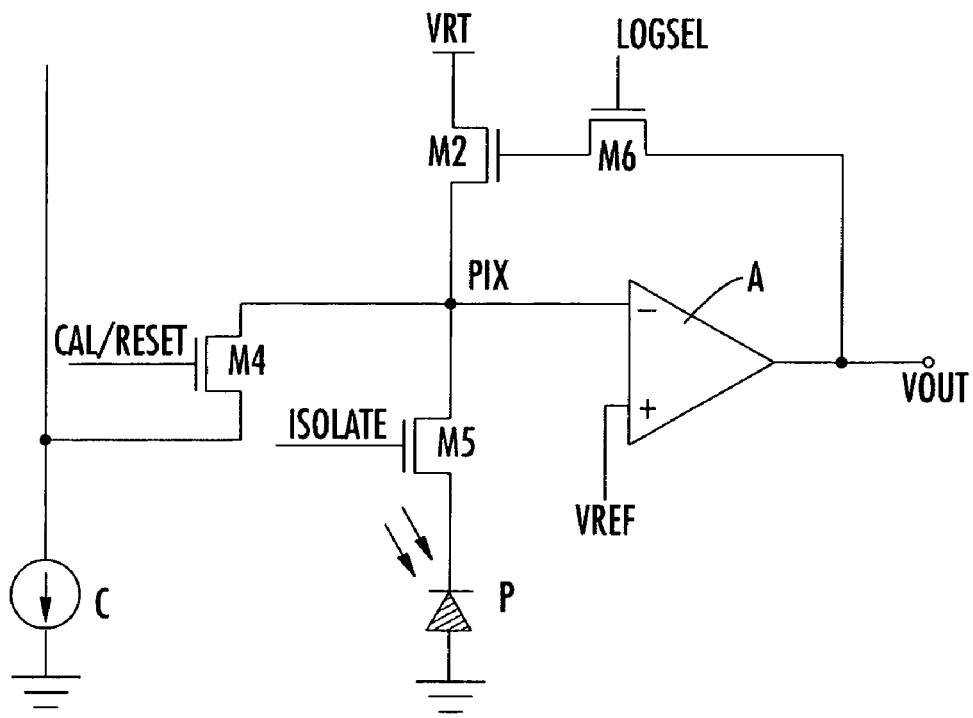
FIG. 3 illustrates operation of the pixel as shown in FIG. 2 in a logarithmic mode.

The pixel is operated in the logarithmic mode by connecting an amplifier A from the column as shown in FIG. 3. The transistor M1 of FIG. 2 forms the inverting input of the amplifier A. The non-inverting input is held at a reference voltage Vref, and thus the node pix will sit at a level given by:

$$V\text{pix} = V\text{ref} + V\text{off} \quad (1)$$

where Voff is the offset of the amplifier A. The output voltage is thus given by:

$$V\text{out} = V\text{pix} + V\text{gs}(M2) \quad (2)$$

where Vgs(M2) is the gate-source voltage of device M2 which is determined by the photocurrent and has a logarithmic dependence.

The offset of the amplifier can be removed by performing calibration, that is, by bringing the pixels into a reference state so that the FPN can be learned and cancelled. To do this, the photodiode P is isolated from the load device M2 by turning off device M5. This stops the photocurrent from corrupting the calibration. One method of generating a calibration current for device M2 is to use M4 as a switch to an in-column current source C. This allows a matched current to be pulled through the load device of each pixel, and places each pixel into a reference state which should be equivalent to illuminating the sensor with a uniform intensity.

Other methods of calibration could be used, for example, those shown in Kavadias et al., IEEE Journal of Solid-State Circuits, vol. 35, No. 8, August 2000 and in Loose et al., ibid., vol. 36, No. 4, April 2001, may be used.

Figure 4:
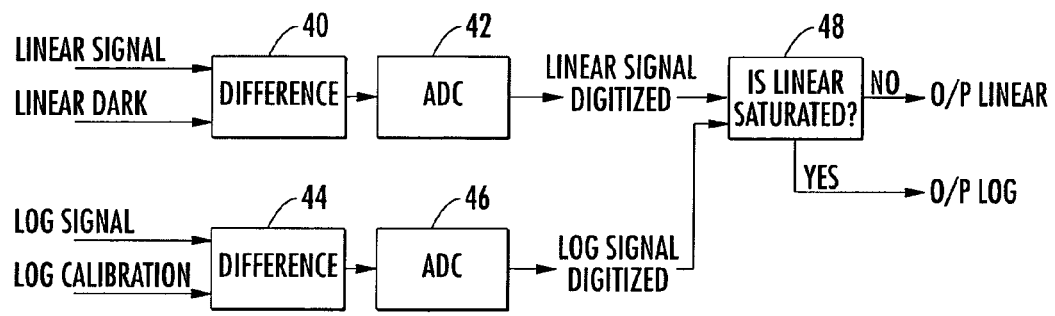
FIG. 4 is a block diagram of one form of circuitry used in a readout chain according to the invention.

Referring to FIG. 4, one suitable readout scheme for selecting between linear and logarithmic outputs is shown. The linear and log signals for each given pixel are read out sequentially. The linear signal and the corresponding dark reference signal are applied to a difference circuit 40, and the difference is converted to digital format by analog-to-digital converter 42. The log signal and the log calibration signal are applied to a difference circuit 44, and the difference is converted to a digital format by analog-to-digital converter 46. The two digital signals are applied to a logic circuit 48 that passes the linear or the log signal based upon whether or not the linear signal is saturated.

Figure 5:
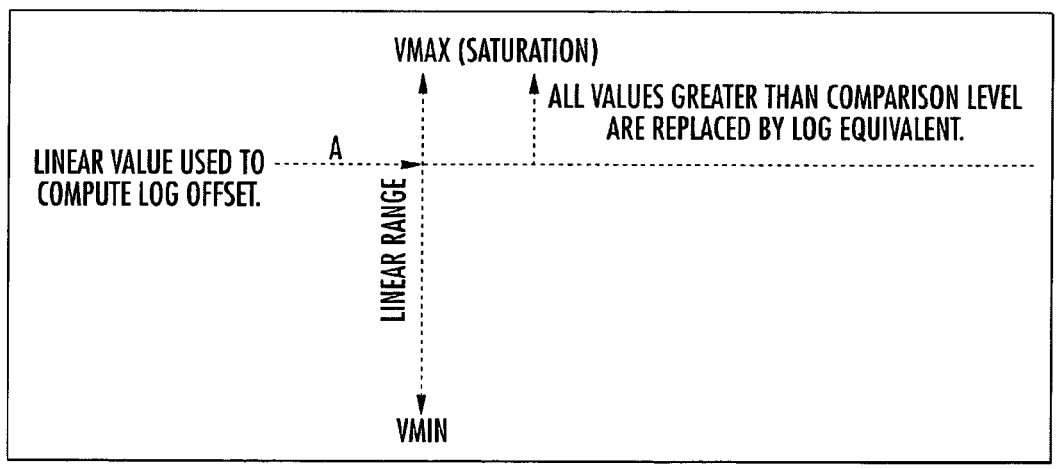
FIG. 5 illustrates voltage values used in the circuit as shown in FIG. 4.

However, where a log output is used the actual output must include an offset to place it correctly into the linear range. Referring to FIG. 5, the log offset is computed to be a value A by comparing a non-saturated linear value with a log value with a log value and taking the difference. All linear values greater than A are then taken to be saturated or near saturation, and are replaced by log values to which the offset A is added.

The calculation of A can be done once, and need only be changed if the exposure time is altered. Thus, the present invention combines features of linear and logarithmic sensors in a manner that avoids or minimizes the drawbacks of both types.

That which is claimed is:

1. An image sensor comprising:
   an array of pixels, each pixel comprising
      a photodiode,
      a first output circuit for deriving a linear output signal by applying a reset signal to said photodiode and reading a voltage on said photodiode after an integration time, said first output circuit comprising
         a reset switch for applying the reset voltage to said photodiode, said reset switch comprising a reset transistor including a conducting terminal connected to said photodiode, and
         a readout switch for turning on the conducting terminal of said reset transistor after expiration of the integration time, said readout switch comprising a readout transistor including a conducting terminal connected to the conducting terminal of said reset transistor and to said photodiode, and including a control terminal,
      a second output circuit for deriving a logarithmic output signal by reading a near instantaneous illumination-dependent voltage on said photodiode that is a logarithmic function of the illumination, said second output circuit comprising
         an amplifier including an output and at least one input connected to the conducting terminal of said reset transistor, to the conducting terminal of said readout transistor and to said photodiode, and
         a log select switch for connecting said amplifier to said photodiode, said log select switch comprising a log select transistor including a pair of conducting terminals connected between the output of said amplifier and the control terminal of said readout transistor, and including a control terminal to receive a log select signal, and
      said first and second output circuits sequentially providing the linear and logarithmic output signals; and
   an output selection circuit coupled to said array of pixels for selecting between the linear output signal and the logarithmic output signal as an output signal.

2. The image sensor according to claim 1, wherein said amplifier comprises a differential amplifier so that the at least one input includes an inverting input connected to the conducting terminal of said reset transistor, and a non-inverting input connected to a reference voltage.

3. The image sensor according to claim 1, further comprising a calibration circuit for calibrating each pixel before deriving the logarithmic output signal.

4. The image sensor according to claim 3, wherein said calibrating circuit comprises a constant current source selectively connected to each respective pixel.

5. The image sensor according to claim 4, wherein an output node is associated with each photodiode, and wherein the linear and logarithmic output signals are derived from the output node, said calibration circuit further comprising a switch connected between said photodiode and the output node for isolating said photodiode from the output node while calibration takes place.

6. An image sensor comprising:
an array of pixels, each pixel comprising
a photodiode,
a first output circuit connected to said photodiode for generating an output signal to be a linear output signal, said first output circuit comprising
a reset switch for applying a reset voltage to said photodiode, said reset switch comprising a reset transistor including a conducting terminal connected to said photodiode, and
a readout switch for turning on the conducting terminal of said reset transistor, said readout switch comprising a readout transistor including a conducting terminal connected to the conducting terminal of said reset transistor and to said photodiode, and including a control terminal,
a second output circuit connected to said photodiode for generating the output signal to be a logarithmic output signal by reading a near instantaneous illumination-dependent voltage on said photodiode that is a logarithmic function of the illumination, said second output circuit comprising
an amplifier including an output and at least one input connected to the conducting terminal of said reset transistor, to the conducting terminal of said readout transistor and to said photodiode, and
a log select switch for connecting said amplifier to said photodiode, said log select switch comprising a log select transistor including a pair of conducting terminals connected between the output of said amplifier and the control terminal of said readout transistor, and including a control terminal to receive a log select signal,
said first and second output circuits sequentially providing the linear and logarithmic output signals; and
an output selection circuit coupled to said array of pixels for selecting between the linear output signal and the logarithmic output signal as the output signal.

7. The image sensor according to claim 6, wherein the linear output signal is selected if the pixel has not saturated during generation of the linear output signal, otherwise, the logarithmic output signal is selected.

8. The image sensor according to claim 6, wherein said first output circuit derives the linear output signal by applying a reset signal to said photodiode and reading a voltage on said photodiode after an integration time.

9. The image sensor according to claim 6, wherein said amplifier comprises a differential amplifier so that the at least one input includes an inverting input connected to the conducting terminal of said reset transistor, and a non-inverting input connected to a reference voltage.

10. The image sensor according to claim 6, further comprising a calibration circuit for calibrating each pixel before deriving the logarithmic output signal.

11. The image sensor according to claim 10, wherein said calibrating circuit comprises a constant current source selectively connected to each respective pixel.

12. The image sensor according to claim 11, wherein an output node is associated with each photodiode, and wherein the linear and logarithmic output signals are derived from the output node, said calibration circuit further comprising a switch connected between said photodiode and the output node for isolating said photodiode from the output node while calibration takes place.

13. A method for operating an image sensor comprising an array of pixels, each pixel comprising a photodiode, the method comprising:
deriving a linear output signal from each pixel using a first output circuit comprising a reset switch for applying a reset voltage to the photodiode, the reset switch comprising a reset transistor including a conducting terminal connected to the photodiode, and a readout switch for turning on the conducting terminal of the reset transistor after expiration of an integration time, the readout switch comprising a readout transistor including a conducting terminal connected to the conducting terminal of the reset transistor and to the photodiode, and including a control terminal;
deriving a logarithmic output signal from each pixel using a second output circuit by reading a near instantaneous illumination-dependent voltage on the photodiode that is a logarithmic function of the illumination, the second output circuit comprising an amplifier including an output and at least one input connected to the conducting terminal of the reset transistor, to the conducting terminal of the readout transistor and to the photodiode, and a log select switch for connecting the amplifier to the photodiode, the log select switch comprising a log select transistor including a pair of conducting terminals connected between the output of the amplifier and the control terminal of the readout transistor, and including a control terminal to receive a log select signal;
sequentially providing the linear and logarithmic output signals; and
selecting between the linear output signal and the logarithmic output signal as an output signal.

14. The method according to claim 13, further comprising calibrating each pixel before generating the corresponding logarithmic output signal.

15. The method according to claim 14, wherein each pixel is calibrated by applying a constant current thereto.

16. The method according to claim 15, wherein an output node is associated with each photodiode, and wherein the linear and logarithmic outputs are generated with respect to the output node, and a calibration circuit comprising a switch is connected between the photodiode and the output node for isolating the photodiode from the output node while calibration takes place.

* * * * *

UNITED STATES PATENT AND TRADEMARK OFFICE
CERTIFICATE OF CORRECTION

| | | |
|---|---|---|
| PATENT NO. | : 7,804,537 B2 | Page 1 of 1 |
| APPLICATION NO. | : 10/820464 | |
| DATED | : September 28, 2010 | |
| INVENTOR(S) | : Storm et al. | |

It is certified that error appears in the above-identified patent and that said Letters Patent is hereby corrected as shown below:

| | |
|---|---|
| Front Page, Foreign Application Priority Data | Insert: --May 6, 2003 (EP)...................03252835.8-- |
| Column 2, Line 12 | Delete: "comprising"<br>Insert: --comprise-- |
| Column 4, Line 8 | Delete: "with a log value" |

Signed and Sealed this
Twenty-first Day of June, 2011

David J. Kappos
*Director of the United States Patent and Trademark Office*